(12) United States Patent
Yan et al.

(10) Patent No.: US 9,857,551 B2
(45) Date of Patent: Jan. 2, 2018

(54) LENS MODULE

(71) Applicants: Junjie Yan, Shenzhen (CN); Chuandong Wei, Shenzhen (CN); Chunhuan Fang, Shenzhen (CN); Lei Zhang, Shenzhen (CN); Liangwei Wan, Shenzhen (CN)

(72) Inventors: Junjie Yan, Shenzhen (CN); Chuandong Wei, Shenzhen (CN); Chunhuan Fang, Shenzhen (CN); Lei Zhang, Shenzhen (CN); Liangwei Wan, Shenzhen (CN)

(73) Assignee: AAC ACOUSTIC TECHNOLOGIES (SHENZHEN) CO., LTD, Shenzhen (CN)

( * ) Notice: Subject to any disclaimer, the term of this patent is extended or adjusted under 35 U.S.C. 154(b) by 0 days.

(21) Appl. No.: 14/656,996

(22) Filed: Mar. 13, 2015

(65) Prior Publication Data
US 2015/0260944 A1    Sep. 17, 2015

(30) Foreign Application Priority Data

Mar. 14, 2014  (CN) .................... 2014 2 0123748 U

(51) Int. Cl.
*G02B 7/00* (2006.01)
*G02B 7/02* (2006.01)
*G02B 13/00* (2006.01)

(52) U.S. Cl.
CPC ............ *G02B 7/021* (2013.01); *G02B 7/003* (2013.01); *G02B 7/022* (2013.01); *G02B 13/004* (2013.01)

(58) Field of Classification Search
CPC .......... G02B 7/02; G02B 7/021; G02B 7/022; G02B 7/003; G02B 13/0015; H04N 5/2254
See application file for complete search history.

(56) References Cited

U.S. PATENT DOCUMENTS

2006/0140623 A1* 6/2006 Yu .................... G02B 7/021
                                                        396/529
2013/0027788 A1* 1/2013 Yen .................... G02B 13/0045
                                                        359/763

(Continued)

FOREIGN PATENT DOCUMENTS

JP        2006030894 A  *  2/2006

OTHER PUBLICATIONS

English translation of the Japanese document.*

*Primary Examiner* — Bumsuk Won
*Assistant Examiner* — Ephrem Mebrahtu
(74) *Attorney, Agent, or Firm* — Na Xu; IPro, PLLC

(57) ABSTRACT

A lens module includes a lens barrel, and a lens group received by the lens barrel. The lens barrel includes an first supporter, a second supporter extending vertically from the first supporter, and a receiving space formed by those supporters, the first supporter having a light aperture, the second supporter having an inner surface facing the receiving space. The lens group includes a first lens abutting against the inner surface of the second supporter, a second lens stacked on the first lens and abutting against the inner surface of the second supporter, a third lens stacked on the second lens and abutting against the inner surface of the second supporter, and a fourth lens stacked on the third lens and abutting against the inner surface of the second supporter, for ensuring the concentricity among the lenses and keeping the lens group coaxial with the lens barrel.

14 Claims, 4 Drawing Sheets

(56) References Cited

U.S. PATENT DOCUMENTS

2014/0029114 A1* 1/2014 Kim .................. G02B 3/08
                                                    359/709
2015/0241656 A1* 8/2015 Choi ................. G02B 7/021
                                                    359/738

* cited by examiner

LENS MODULE

FIELD OF THE INVENTION

The present invention relates to a lens module, particularly to a miniature lens module in a mobile electronic device.

DESCRIPTION OF RELATED ART

With the rapid development of technologies, electronic devices having image pick-up functions, such as cameras, mobile phones, portable computers, tablets, are equipped with lens modules. For satisfying the demands of high definition pictures, lens modules are designed and manufactured with high accuracies. As one of the key characters of a lens module, concentricity is important for performing high definition pictures.

Generally, a lens module comprises a lens barrel for receiving a plurality of lens groups therein. The lens group should be provided with high concentricity to be concentric with each other, and the combination of the lens group should be concentric with the barrel. During actual manufacturing process, the concentricity between the lens group, or between the lens group and the lens barrel is difficult to be controlled. Thus, this disclosure provides a lens module provided with a special configuration for ensuring the concentricity thereof.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment.

Figure 1:
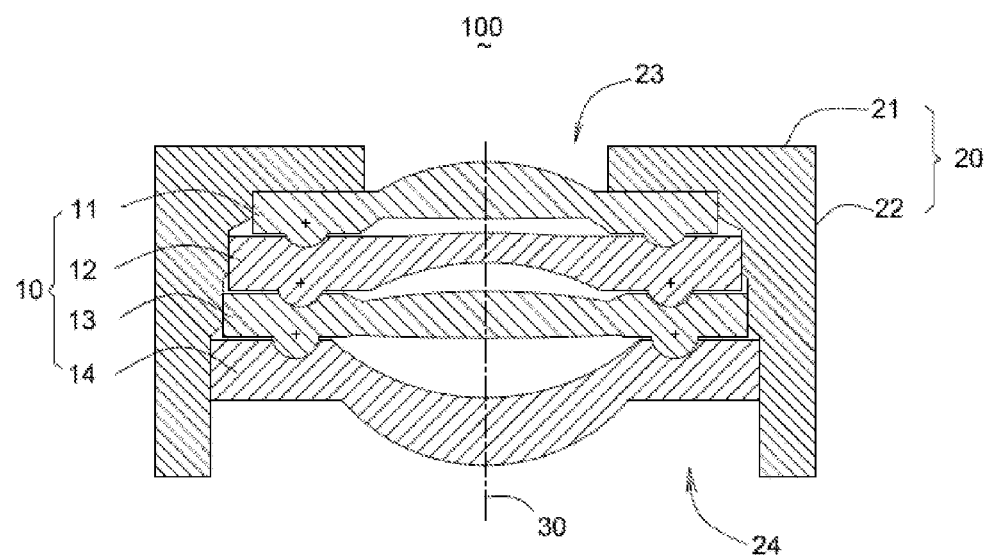
FIG. 1 is an illustrative cross-sectional view of a lens module in accordance with an first exemplary embodiment of the present disclosure.
Figure 2:
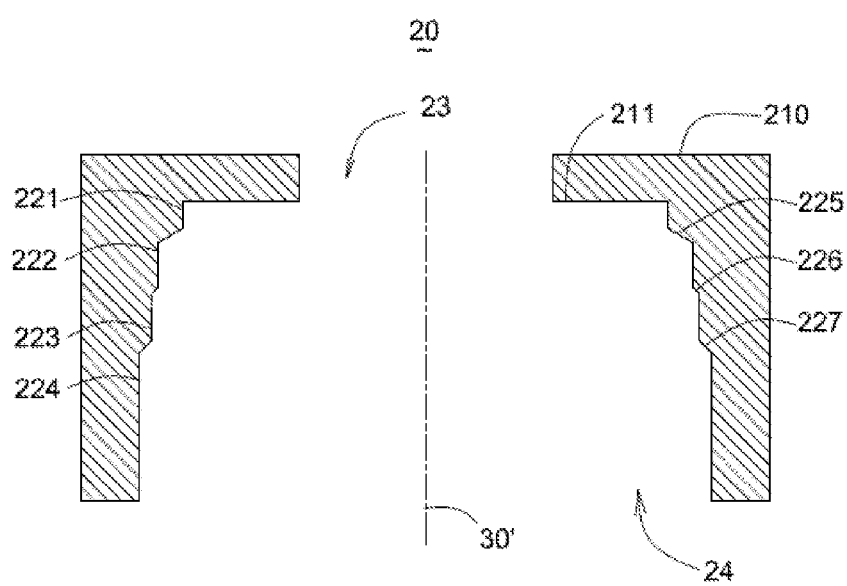
FIG. 2 is an illustrative cross-sectional view of a lens barrel of the lens module in FIG. 1.
Figure 3:
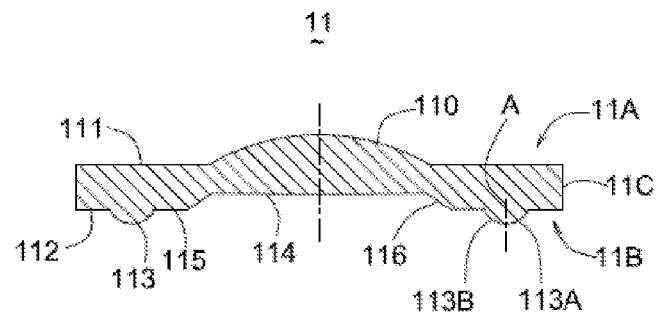
FIG. 3 is an illustrative cross-sectional view of a first lens used in the lens module in FIG. 1.
Figure 4:
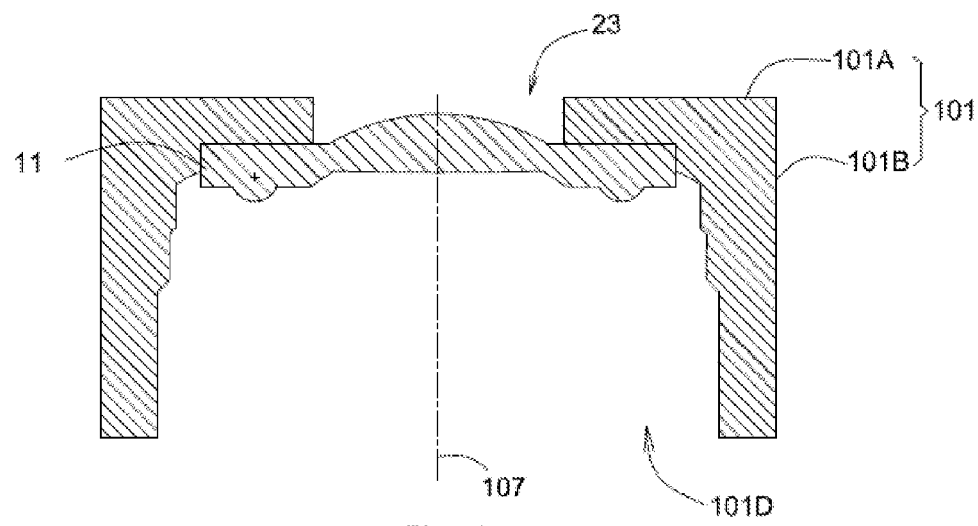
FIG. 4 is an illustrative cross-sectional view of the first lens in FIG. 3 assembled with the lens barrel in FIG. 2.
Figure 5:
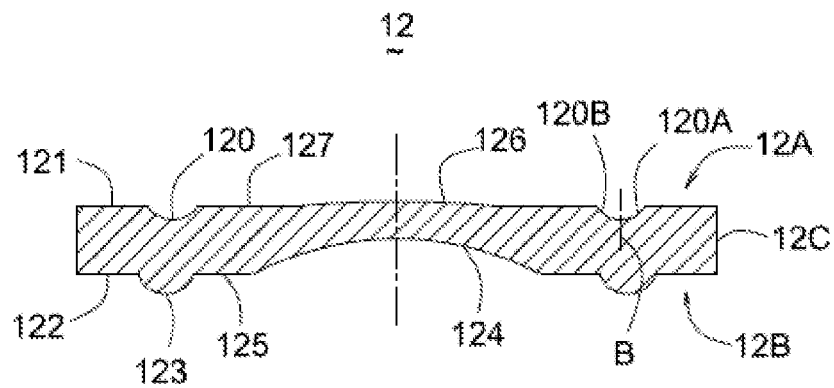
FIG. 5 is an illustrative cross-sectional view of a second lens used in the lens module in FIG. 1.
Figure 6:
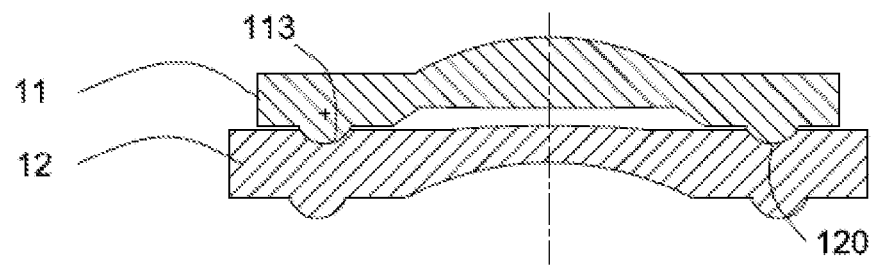
FIG. 6 is an illustrative cross-sectional view of the second lens in FIG. 5 stacked on the first lens in FIG. 3.
Figure 7:
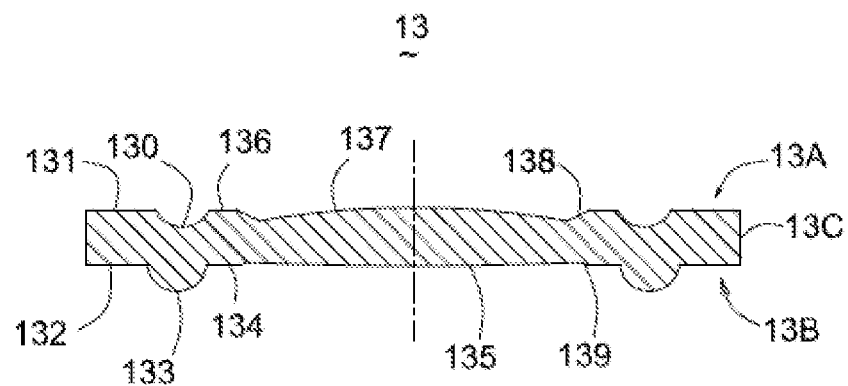
FIG. 7 is an illustrative cross-sectional view of a third lens used in the lens module in FIG. 1.
Figure 8:
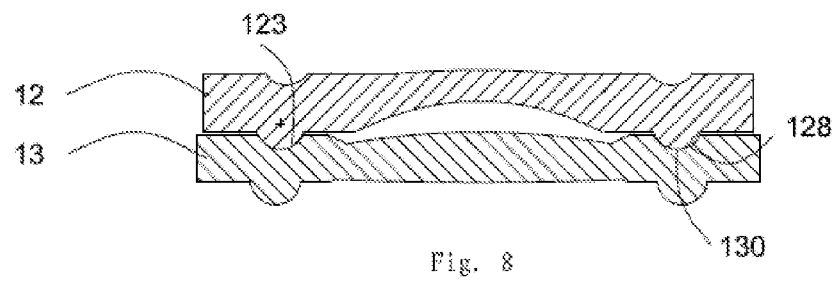
FIG. 8 is an illustrative cross-sectional view of the third lens in FIG. 7 stacked on the second lens in FIG. 5.
Figure 9:
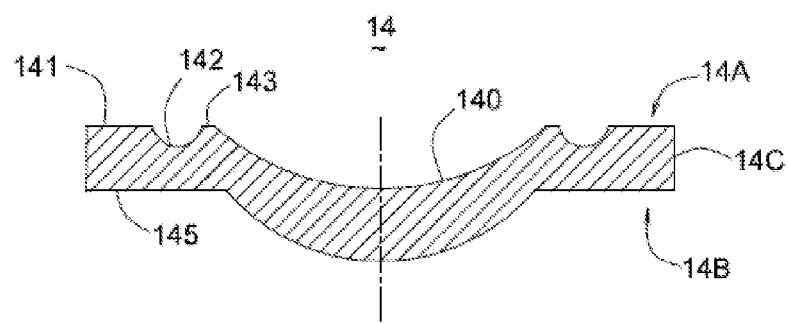
FIG. 9 is an illustrative cross-sectional view of a fourth lens used in the lens module in FIG. 1.
Figure 10:
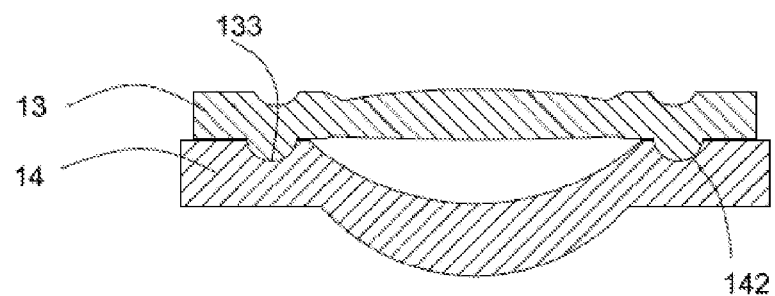
FIG. 10 is an illustrative cross-sectional view of the fourth lens in FIG. 9 stacked on the third lens in FIG. 7.

FIG. 1 shows an exemplary embodiment of a lens module 100 of the present disclosure, which could be used in a mobile phone, a tablet PC, or a digital camera. Referring to FIGS. 1 and 2, the lens module 100 comprises a lens barrel 20 and a lens group 10 supported by the lens barrel 20. The lens barrel 10 includes a first supporter 21, a second supporter 22 extending vertically from an edge of the first supporter 21, and a receiving space 24 formed by the first supporter 21 and the second supporter 22. Specifically, the second supporter 22 is integrated with the first supporter 21 in this embodiment. The lens group 10 is received in the receiving space 24. The lens group 10 comprises a first lens 11, a second lens 12 stacked on the first lens 11, a third lens 13 stacked on the second lens 12, and a fourth lens 14 stacked on the third lens 13. The lens group 10 has an optical axis 30. The first lens 11, the second lens 12, the third lens 13 and the fourth lens 14 are aligned sequentially along the optical axis 30.

The first supporter 21 comprises an top surface 210, a bottom surface 211 opposite and parallel to the top surface 210, and a light aperture 23 for allowing lights to pass into the lens barrel 10. The light aperture 23 is drilled through the first supporter 21. Specifically, the light aperture 23 is a cylindrical-shaped hole drilled perpendicularly in center of the first supporter 21. The light aperture 23 has a central axis 30'. The second supporter 22 comprises an internal surface facing and bounding the receiving space 24, including a first inner surface 221 jointing with and perpendicular to the bottom surface 211, a second inner surface 222 parallel with the first inner surface 221, a first sloping surface 225 connecting the first inner surface 221 with the second inner surface 222, a third inner surface 223 parallel with the first inner surface 221, a second sloping surface 226 connecting the second inner surface 222 with the third inner surface 223, a fourth inner surface 224 parallel with the first inner surface 221, and a third sloping surface 227 connecting the third inner surface 223 with the fourth inner surface 224. Those sloping surfaces 225, 226, and 227 extend in a direction away from the central axis 30'. The receiving space 24 is formed by those inner surfaces, the sloping surfaces and the bottom surface 211 cooperatively for receiving the lens group 10.

Referring to FIGS. 1-4, the first lens 11 comprises a first object-side surface 11A, a first image-side surface 11B opposite to the first object-side surface 11A, and a first lateral surface 11C connecting the first object-side surface 11A with the first image-side surface 11B. The first object-side surface 11A has a first convex part 110 convex towards the light aperture 23 and centered about the optical axis 30, and a first object-side connecting plane 111 connecting the first convex part 110 with the first lateral surface 11C. Herein, the first lateral surface 11C abuts against the first inner surface 221 of the second supporter 22, and the first connecting plane 111 directly abuts against the bottom surface 211, so that the first lens 11 can be kept coaxial with the lens barrel 20.

The first image-side surface 11B includes a first image-side connecting part 112, a first engaging portion 113, a first image-side extending plane 115, a first image-side connecting slope 116, and a first image-side optical surface 114, arranged from periphery to center thereof. The first engaging portion 113 protrudes towards the second lens 12, the first image-side connecting part 112 connects the first lateral surface 11C with one end of the first engaging portion 113, the first image-side extending plane 115 connects the other end of the first engaging portion 113 with the first image-side connecting slope 116, and the first image-side optical surface 114 is arranged in the middle of the first image-side surface 11B and centered about the optical axis 30 for serving as an optical zone. The first image-side connecting slope 116 inclines downwards from the first image-side optical surface 114, and away from the optical axis 30.

Referring to FIGS. 3-6, the second lens 12 includes a second object-side surface 12A, an second image-side surface 12B opposite the second object-side surface 12A, and a second lateral surface 12C connecting the second object-side surface 12A with the second image-side surface 12B. The second lateral surface 12C directly abuts against the second inner surface 222. The second object-side surface 12A includes a first concave portion 120 concave towards the second image-side surface 12B, a second object-side optical surface 126 in the middle thereof, a second object-side connecting plane 121 connecting the second lateral surface 12C and one end of the first concave portion 120, and a second object-side extending part 127 connecting the other end of the first concave portion 120 and the second object-side optical surface 126. When assembled, the first lens 11 is stacked on the second lens 12, the first concave portion 120 engages with the first engaging portion 113, and the second lateral surface 12C abuts against the second inner surface 222. Therefore, the second lens 12 can be coaxial with the first lens 11 and the lens barrel 20.

The second image-side surface 12B includes a second image-side connecting part 122, a second engaging portion 123, a second image-side extending plane 125, and a second image-side optical surface 124, arranged from periphery to center thereof. The second engaging portion 123 protrudes towards the third lens 13, the second image-side connecting part 122 connects the second lateral surface 12C with one end of the second engaging portion 123, the second image-side extending plane 125 connects the other end of the second engaging portion 123 with the second image-side optical surface 124 which is arranged in the middle of the second image-side surface 12B and centered about the optical axis 30 for serving as an optical zone. Specifically, the second image-side optical surface 124 is arc shaped and concave towards the object-side surface 12A.

In this exemplary embodiment, the first image-side connecting part 112 keeps a distance from the second object-side connecting plane 121, and the first image-side extending plane 115 keeps a distance from the second object-side extending part 127. In another words, the first image-side surface 11B of the first lens 11 does not completely engage with the second object-side surface 12A of the second lens 2. Therefore, the concentricity between the first lens 11 and the second lens 12 is determined, for the first engaging portion 113 engages with the first concave portion 120, the first lateral surface 11C abuts against the first inner surface 221, and the second lateral surface 12C abuts against the second inner surface 222, in which case, the concentricity can reduce the assembling tolerance and improve the assembling accuracy. The first engaging portion 113 and the first concave portion 120 define a first alignment accuracy for holding the first lens 11 and the second lens 12 in a precisely coaxial relationship. In an exemplary embodiment, when the first lens 11 is stacked on the second lens 12, a first jointing curve 114 is formed between the first engaging portion 113 and the first concave portion 120, for filling possible spaces between the first engaging portion 113 and the first concave portion 120.

Referring to FIGS. 5-8, the third lens 13 comprises a third object-side surface 13A, a third image-side surface 13B opposite to the third object-side surface 13A, and a third lateral surface 13C connecting the third object-side surface 13A and the third image-side surface 13B. The third lateral surface 13C directly abuts against the third inner surface 223. The third object-side surface 13A includes a third object-side connecting plane 131, a second concave portion 130, a third object-side extending part 136, a third object-side connecting slope 138, and a third object-side optical surface 137, arranged from periphery to center thereof. The second concave portion 130 concave towards the third image-side surface 13B for engaging with the second engaging portion 123. The third object-side connecting plane 131 connects the third lateral surface 13C and one end of the second concave portion 130, and the third object-side extending part 136 connects the other end of the second concave portion 130 with the third image-side connecting slope 138. The third object-side connecting slope 138 extending from the third object-side extending part 136 to the third object-side optical surface 137, in a direction close to the central axis 30'. Specifically, the third optical surface 137 is arc shaped and convex away from the third image-side surface 13B.

In this exemplary embodiment, the second image-side connecting part 122 keeps a distance from the third object-side connecting plane 131, and the second image-side extending plane 125 keeps a distance from the third object-side extending part 136. In another words, the second image-side surface 12B of the second lens 12 does not completely engage with the third object-side surface 13A of the second lens 13. Therefore, the concentricity accuracy between the second lens 12 and the third lens 13 is determined, for the second engaging portion 123 engages with the second concave portion 130, the second lateral surface 12C abuts against the second inner surface 222, and the third lateral surface 13C abuts against the third inner surface 223, in which case, the concentricity can reduce the assembling tolerance and improve the assembling accuracy. The second engaging portion 123 and the second concave portion 130 define a second alignment accuracy for holding the second lens 12 and the third lens 13 in a precisely coaxial relationship. In this exemplary embodiment, when the second lens 12 is stacked on the third lens 13, the second concave portion 130 engages with the second engaging portion 123, accordingly forming a second jointing curve 128 between the second concave portion 130 and the second engaging portion 123 for filling possible spaces.

The third image-side surface 13B includes a third image-side connecting part 132, a third engaging portion 133, a third image-side extending plane 134, and a third image-side optical surface 135, arranged from periphery to center thereof. The third engaging portion 133 protrudes towards the fourth lens 14, the third image-side connecting part 132 connects the third lateral surface 13C with one end of the third engaging portion 133, the third image-side extending plane 134 connects the other end of the third engaging portion 133 with the third image-side optical surface 135 which is arranged in the middle of the third image-side surface 13B and centered about the optical axis 30 for serving as an optical zone.

Referring to FIGS. 7-10, the fourth lens 14 comprises a fourth object-side surface 14A, an fourth image-side surface 14B opposite to the fourth object-side surface 14A and a fourth lateral surface 14C connecting the fourth object-side surface 14A and the fourth image-side surface 14B. The fourth lateral surface 14C abuts against the fourth inner surface 224 of the second supporter 22, for ensuring the central axis 30 is coaxial with the optical axis 30'. The fourth object-side surface 14A has a fourth object-side connecting plane 141, a third concave portion 142, a fourth object-side extending part 143, and a fourth object-side optical surface 140, arranged from periphery to center. The third concave portion 142 concave away from the third image-side surface 13B for engaging with the third engaging portion 133. The fourth object-side connecting plane 141 connects the fourth lateral surface 14C and one end of the third concave portion 142, and the fourth object-side extending part 143 connects the other end of the third concave portion 142 with the fourth object-side optical surface 140. Specifically, the fourth optical surface 140 is arc shaped and concave away from the third image-side surface 13B.

In this exemplary embodiment, the third image-side connecting part 132 keeps a distance from the fourth object-side connecting plane 141, and the third image-side extending plane 134 keeps a distance from the fourth object-side extending part 143. In another words, the third image-side surface 13B does not completely engage with the fourth object-side surface 14A. Therefore, the concentricity between the third lens 13 and the fourth lens 14 is determined, for the third engaging portion 133 engages with the third concave portion 142, the third lateral surface 13C abuts against the third inner surface 223, and the fourth lateral surface 14C abuts against the fourth inner surface 224, in which case, the concentricity can reduce the assembling tolerance and improve the assembling accuracy. The third engaging portion 133 and the third concave portion 142 define a third alignment accuracy for holding the third lens 13 and the fourth lens 14 in a precisely coaxial relationship. In this exemplary embodiment, when the third lens 13 is stacked on the fourth lens 14, the third concave portion 142 engages with the third engaging portion 133, accordingly forming a third jointing curve 139 between the third concave portion 142 and the third engaging portion 133 for filling possible spaces.

The fourth image-side surface 14B includes a fourth image-side optical surface 144 in the middle thereof and a fourth image-side connecting part 145 connecting to the fourth image-side optical surface 144. The fourth image-side connecting part 145 is convex away from the fourth object-side surface 14A, the fourth image-side connecting part 145 connects the fourth lateral surface 14C with the fourth image-side optical surface 144, and the fourth image-side optical surface 144 is centered about the optical axis 30 for serving as an optical zone.

Outlines of the engaging portions 113, 123, 133 and the concave portions 120, 130, 142 are respectively configured to be a part of a circle for ensuring the concentricity between the lens group. In other words, the outlines of the engaging portions 113, 123, 133 and the concave portions 120, 130, 142 are shaped as circular arc. The jointing curves 114, 128, and 139 respectively help enhance the concentricity between the lens group 10, and prevent the misalignment of the lens group 10.

Optionally, heights between the jointing curves 114, 128, 139 and the corresponding image-side surfaces 11B, 12B, 13B can be changed according to different requirements. The engaging portions may be interchanged with the corresponding concave portions, for example, the first engaging portion provided on the first lens may be interchanged with the first concave portion provided on the second lens. Similarly, the shape of the engaging portions may be in variety, as long as the engaging portion is shaped to match the engaging portion for forming the alignment accuracy to ensure the central axis is coaxial with the optical axis.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens module, comprising:
    a lens barrel, comprising an first supporter, a second supporter extending vertically from the first supporter and a receiving space formed by the first supporter and the second supporter, the first supporter having a light aperture with a central axis, the first supporter having a bottom surface connecting to the second supporter, the second supporter having an inner surface facing and bounding the receiving space; and
    a lens group with an optical axis, comprising:
    a first lens abutting against the first supporter for forming a first alignment accuracy for ensuring the central axis coaxial with the optical axis, comprising a first object-side surface, a first image-side surface opposite to the first object-side surface, and a first lateral surface connecting the first object-side surface with the first image-side surface, the first lateral surface abutting against the inner surface of the second supporter;
    a second lens stacked on the first lens, comprising a second object-side surface facing the first image-side surface, a second image-side surface opposite to the second object-side surface, and a second lateral surface connecting the second object-side surface with the second image-side surface, the second lateral surface abutting against the internal surface of the second supporter;
    a third lens stacked on the second lens, comprising a third object-side surface, a third image-side surface opposite to the third object-side surface, and a third lateral surface connecting the third object-side surface and the third image-side surface, the third lateral surface abutting against the inner surface of the second supporter; and
    a fourth lens stacked on the third lens, comprising a fourth object-side surface, an fourth image-side surface opposite to the fourth object-side surface, and a fourth lateral surface connecting the fourth object-side surface and the fourth image-side surface, the fourth lateral surface abutting against the inner surface of the second supporter;
    the first image-side surface having a first engaging portion protruding towards the second lens, and the second object-side surface having a first concave portion concave towards the second image-side surface for engaging with the first engaging portion of the first lens, for forming a first alignment accuracy for ensuring a concentricity between the first lens and the second lens;
    the first image-side surface having a first image-side connecting part connecting the first lateral surface with one end of the first engaging portion, and a first image-side extending plane connecting to the other end of the first engaging portion; the second object side surface having a second object-side connecting plane connecting the second lateral surface and one end of the first concave portion, and a second object-side extending part connecting the other end of the first concave portion; the first image-side connecting part keeping a distance from the second object-side connecting plane; the first image-side extending plane keeping a distance from the second object-side extending part;
    the first engaging portion and the first concave portion both configured to be arc-shaped respectively, with an arc length of the first engaging portion longer than that of the first concave portion.

2. The lens module as described in claim 1, wherein the first object-side surface has a first convex part convex towards the light aperture and centered about the optical axis, and a first object-side connecting plane connecting the first convex part with the first lateral surface, the first object-side connecting plane abutting against the bottom surface of the first supporter.

3. The lens module as described in claim 1, wherein the first engaging portion provided on the first lens is interchanged with the first concave portion provided on the second lens.

4. The lens module as described in claim 1, wherein the first image-side surface includes a first image-side connecting part, the first engaging portion, the first image-side extending plane, a first image-side connecting slope, and a first image-side optical surface, arranged from periphery to center thereof, the first image-side extending plane connecting the other end of the first engaging portion with the first image-side connecting slope, the first image-side optical surface arranged in the middle of the first image-side surface and centered about the optical axis for serving as an optical zone.

5. The lens module as described in claim 4, wherein the second object-side surface comprises a second object-side optical surface in the middle thereof, the second object-side connecting plane, and the second object-side extending part connecting the other end of the first concave portion and the second object-side optical surface.

6. The lens module as described in claim 5, wherein a first jointing curve is formed between the first engaging portion and the first concave portion, for filling possible spaces between the first engaging portion and the first concave portion.

7. The lens module as described in claim 1, wherein, the second image-side surface comprises a second engaging portion protruding towards the third lens, and the third object-side surface comprises second concave portion concave towards the third image-side surface for engaging with the second engaging portion, for forming a second alignment accuracy for ensuring a concentricity between the second lens and the third lens.

8. The lens module as described in claim 7, wherein the second engaging portion of the second lens and the second concave portion of the third lens are configured to be arc-shaped, respectively, with an arc length of the second engaging portion larger than that of the second concave portion.

9. The lens module as described in claim 7, wherein the second image-side surface comprises a second image-side connecting part, the second engaging portion, a second image-side extending plane, and a second image-side optical surface, arranged from periphery to center thereof, and the third object-side surface comprises a third object-side connecting plane, the second concave portion, the third object-side extending part, a third object-side connecting slope, and a third object-side optical surface, arranged from periphery to center, the second image-side extending plane keeping a distance from the third object-side extending part, the second image-side connecting part keeping a distance from the third object-side connecting plane.

10. The lens module as described in claim 9, wherein the second concave portion engages with the second engaging portion, accordingly forming a second jointing curve between the second concave portion and the second engaging portion for filling possible spaces.

11. The lens module as described in claim 1, wherein the third image-side surface comprises a third engaging portion protruding towards the fourth lens, and the fourth object-side surface comprises a third concave portion concave away from the third image-side surface for engaging with the third engaging portion, for forming a third alignment accuracy for ensuring a concentricity between the third lens and the fourth lens.

12. The lens module as described in claim 11, wherein the further the third image-side surface comprises a third image-side connecting part, the third engaging portion, a third image-side extending plane, and a third image-side optical surface, arranged from periphery to center thereof, and the fourth object-side surface comprises a fourth object-side connecting plane, the third concave portion, a fourth object-side extending part, and a fourth object-side optical surface, arranged from periphery to center, the third image-side extending plane keeping a distance from the fourth object-side extending part, the third image-side connecting part keeping a distance from the fourth object-side connecting plane.

13. The lens module as described in claim 11, wherein the third engaging portion of the third lens and the third concave portion of the fourth lens are configured to be arc-shaped, respectively, with an arc length of the third engaging portion larger than that of the third concave portion.

14. The lens module as described in claim 11, wherein the third concave portion engages with the third engaging portion, accordingly forming a third jointing curve between the third concave portion and the third engaging portion for filling possible spaces.

* * * * *